Sept. 9, 1969     R. G. PARKISON ET AL     3,465,782

FLOAT ACTUATED ROTARY VALVE

Filed Sept. 23, 1964                      6 Sheets-Sheet 1

INVENTORS
Richard G. Parkison
Edward W. Forth
BY
ATTORNEY

Sept. 9, 1969   R. G. PARKISON ET AL   3,465,782
FLOAT ACTUATED ROTARY VALVE
Filed Sept. 23, 1964   6 Sheets-Sheet 2

INVENTORS
Richard G. Parkison
Edward W. Forth
BY *Frank J. Gordon*
ATTORNEY

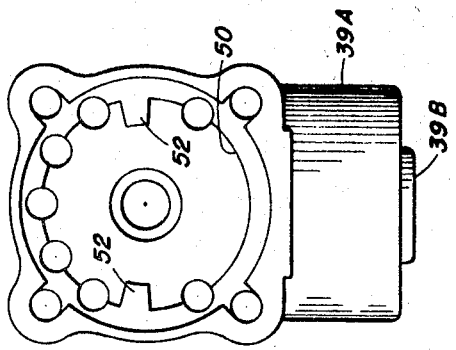
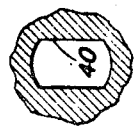
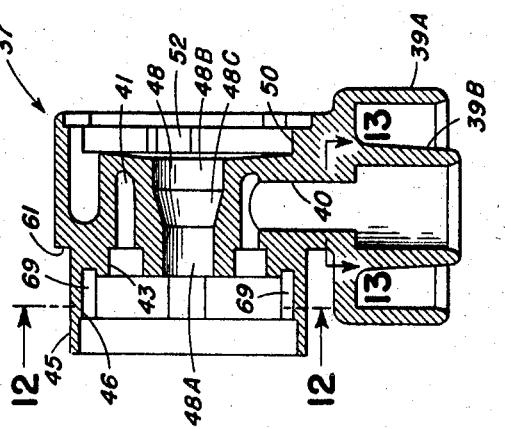
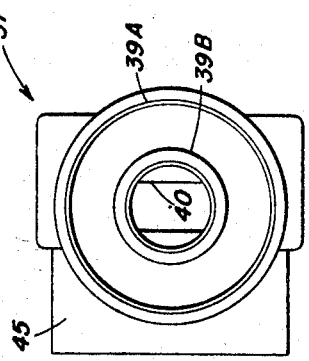
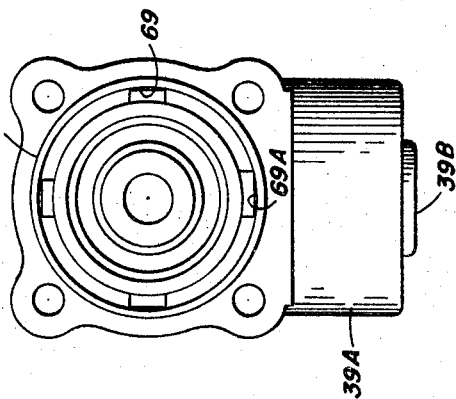
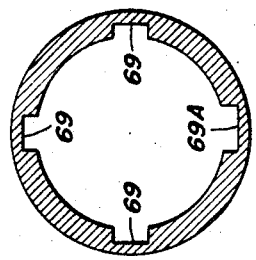

Sept. 9, 1969  R. G. PARKISON ET AL  3,465,782
FLOAT ACTUATED ROTARY VALVE
Filed Sept. 23, 1964  6 Sheets-Sheet 4
Fig. 14.
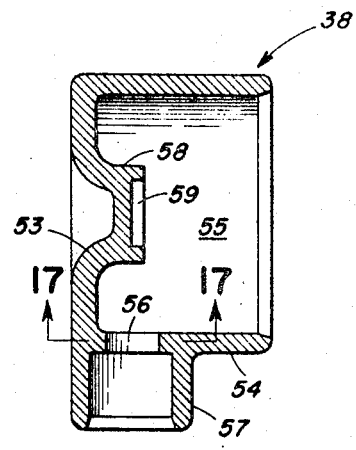
Fig. 17.
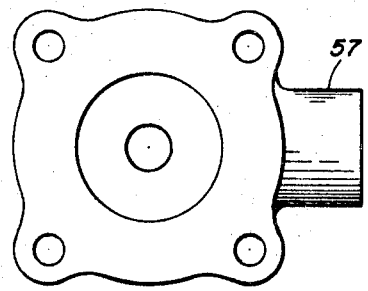
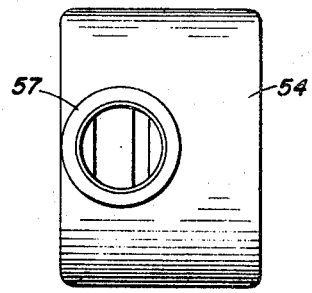
Fig. 16.  Fig. 15.
INVENTORS
Richard G. Parkison
Edward W. Forth
BY
ATTORNEY Sept. 9, 1969 R. G. PARKISON ET AL 3,465,782
FLOAT ACTUATED ROTARY VALVE
Filed Sept. 23, 1964 6 Sheets-Sheet 5
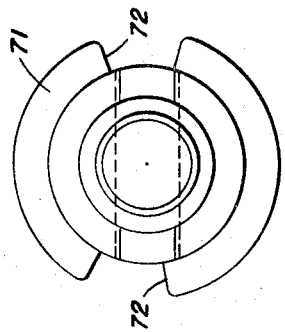
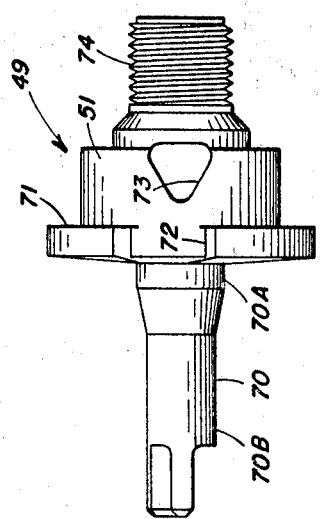
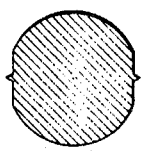
INVENTORS
Richard G. Parkison
Edward W. Forth
BY
ATTORNEY Sept. 9, 1969    R. G. PARKISON ET AL    3,465,782
FLOAT ACTUATED ROTARY VALVE
Filed Sept. 23, 1964    6 Sheets-Sheet 6

INVENTORS
Richard G. Parkison
Edward W. Forth
BY
ATTORNEY

United States Patent Office 3,465,782
Patented Sept. 9, 1969

3,465,782
FLOAT ACTUATED ROTARY VALVE
Richard G. Parkison, Louisville, Ky., and Edward W. Forth, New Canaan, Conn., assignors to American Standard Inc., a corporation of Delaware
Filed Sept. 23, 1964, Ser. No. 398,646
Int. Cl. E03d 1/32, 9/14
U.S. Cl. 137—315                                21 Claims This invention relates in general to a valve and more specifically to an improved valve employing a rotatable ported member cooperating with another ported member to control fluid flow.

An object of this invention s to provide an economical, low cost, positive performing valve constructed and arranged for a relatively long, trouble free life.

Another object is to provide a valve that is highly resistant to both erosive and corrosive effects and which is self-cleaning and wear resistant.

The foregoing and other objects are attained by a valve comprising a housing and valving means including a seat member and a cooperating rotatable valving member interposed within the housing to control the flow of fluid therethrough. The arrangement is such that the valve seat member is provided with port openings and a stem opening disposed in alignment with a bore formed in the housing for receiving a valve actuating stem. The rotating valving member is provided with port openings and is held in intimate contact with the valve seat. In the closed position of the valve, the port openings of the rotary valving member are disposed out of alignment with the respective port openings of the valve seat and in the open position of the valve, the port openings of the valving member are disposed in alignment with the port openings of the valve seat.

The respective valve seat member and valving member may be formed of a ceramic material wherein the contiguous surfaces of the respective members are formed with a highly polished, mirror-like finish to provide watertight seal therebetween and to minimize friction.

The valve actuator or stem rotatably journaled within the bore of the housing section has its inner end extended through the stem opening of the valve seat to engage the rotary valving member. Cooperating means may be provided on the valve stem and the adjacent housing section to limit the angular rotation of the stem. A sealing means is disposed between the valve seat and the adjacent housing section to form a fluid-tight seal therebetween and to function as a means for isolating the stem from the fluid chambers of the valve housing. In one form of the invention the construction of the sealing means is such that it will exert a force on the valving members to hold the valving members into intimate contact at lower fluid pressures. This sealing means also serves to limit the area of the rotatable valving member exposed to inlet fluid pressure so that at higher inlet pressures, the total force acting on the rotatable valving member will not be excessive. The instant invention further contemplates that the valve may be constructed as not to be incorrectly assembled.

Other features and advantages will become more readily apparent when considered in view of the specification and drawings in which:

FIGURE 8 is a sectional view of the body portion of the valve housing.

FIGURES 9 and 10 are end views of FIGURE 8.

FIGURE 11 is a bottom view of FIGURE 8.

FIGURE 12 is a sectional view taken along line 12—12 of FIGURE 8.

FIGURE 13 is a sectional view taken along line 13—13 of FIGURE 8.

FIGURE 14 is a sectional view of the cap portion of the valve housing.

FIGURE 15 is a bottom view of FIGURE 14.

FIGURE 16 is a left end view of FIGURE 14 rotated 90°.

FIGURE 17 is a sectional line taken along line 17—17 of FIGURE 14.

FIGURE 18 is an enlarged side elevation view of the valve stem.

FIGURES 19 and 20 are end views of FIGURE 18.

FIGURE 21 is a cross-sectional view of a modified bearing portion for the valve stem.

Figure 1:
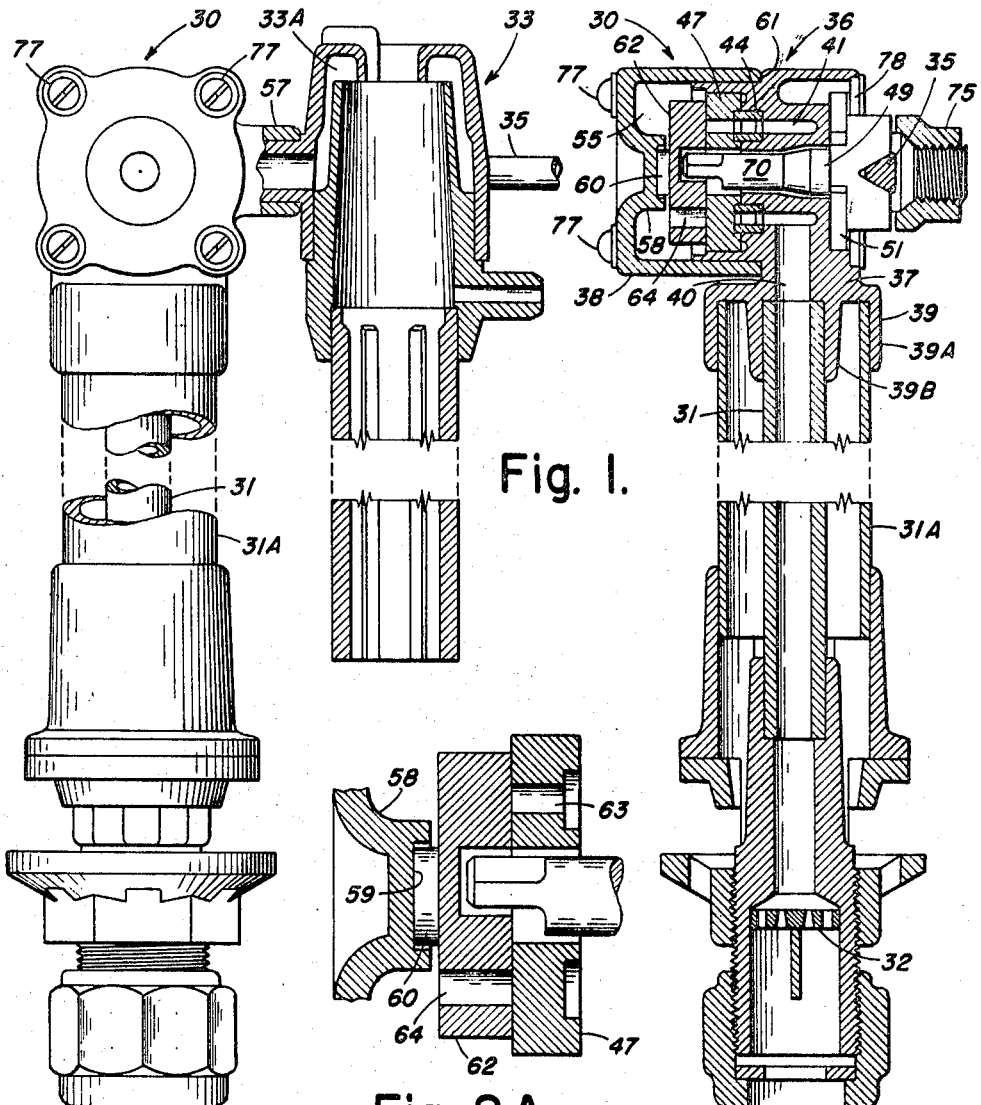
FIGURE 1 is a front elevation view of the improved valve construction of the instant invention utilized in conjunction with a water control for a water closet tank.
Figure 2A:
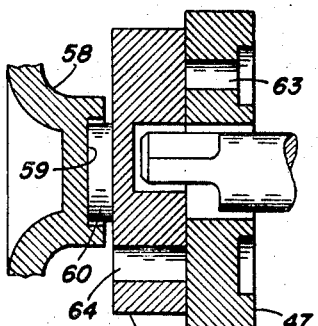
FIGURE 2A is an enlarged detail of the valving means shown in section.
Figure 2:
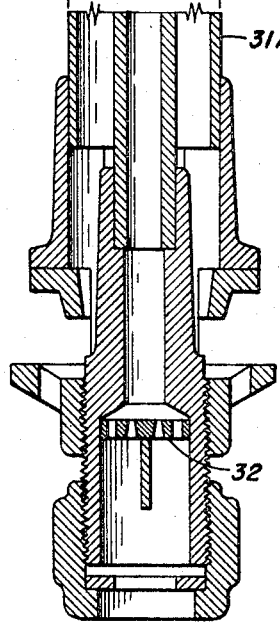
FIGURE 2 is a sectional side view of the valve taken along line 2—2 of FIGURE 3.
Figure 3:
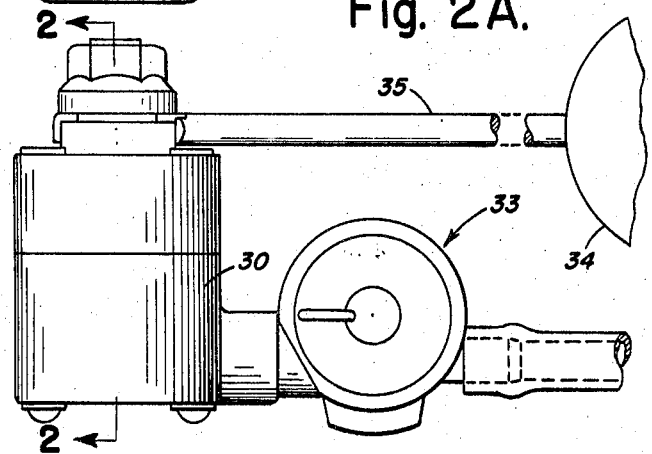
FIGURE 3 is a plan view of FIGURE 1.

Referring to the drawings, FIGURES 1, 2 and 3 illustrate a valve construction 30 of the instant invention utilized, by way of example, as a ballcock, or water control, for a water closet tank (not shown). The valve 30 has its inlet connected to the upper end of a riser tube 31 in which the flow of water therethrough is governed by a silent flow washer 32 of the type disclosed in a copending U.S. patent application Ser. No. 368,867, filed May 20, 1964, now Patent No. 3,359,063. The outlet of the valve 30 is connected to a back flow preventer 33 of a type disclosed in a copending U.S. patent application Ser. No. 381,075 filed July 8, 1964, now Patent No. 3,344,800. The valve 30 is opened by a float 34 connected to the end of a float arm 35 which drops as the water closet is flushed. After the flush, as the tank is being filled, the float 34 rises and in turn shuts off the valve 30 when a predetermined level has been attained.

As will be hereinafter described in further detail, the valve 30 comprises ported discs having contiguous mirror-like surfaces which provide a water tight seal therebetween when held in intimate contact and which allows water to flow when one of the discs is rotated to align the port openings.

The valve housing 36 is preferably formed of two complementary sections, namely a body portion 37 and a cap portion 38. For economy and ease of construction the respective housing portions 37 and 38 may be formed of an all plastic construction, for example, ABS Resin.

As noted in FIGURES 1 and 8 through 13 the body 37 of the valve housing is provided with an integrally connected fitting 39 by which it is secured to the upper end of the riser tube 31 and the associated sheath tube 31A. Essentially, the fitting 39 is defined as integrally connected spaced concentric flanges or collars 39A, 39B sized to receive the upper end portions of the respective tubes 31 and 31A.

The valve portion 37 has formed therein an inlet passageway 40 that connects with the upper end of the riser tube 31 disposed in alignment therewith. The inlet passageway 40 is joined at its upper end with an annular water inlet chamber or passageway 41. The outlet of the inlet chamber 41 is defined as an annular recess 43 (FIG. 8) and is adapted to accept a seal 44 made of a resilient material such as rubber as will be hereinafter described. The valve body 37 has a tubular extension 45 which defines a bore or recess 46 for receiving the valve seat member 47 of the valving means. The tubular extension 45 also provides the means by which the valve body portion 37 is fitted to the cap 38 of the valve housing 36.

The valve body 37 is also provided with an axially disposed bore or passageway 48 (FIG. 8) for receiving a valve stem or shaft 49. The bore 48 extends through the body 37 of the housing and it is coaxially disposed with respect to the annular inlet chamber 41. The bore 48 has cylindrical bearing portion 48A and 48B for rotatably supporting the shaft 49, such bearing portions being connected by a conically shaped transition section 48C. The back or outer side of the valve body 37 is recessed at 50 (FIG. 8) for accommodating a hub portion 51 of the valve shaft 49 as will be hereinafter described.

Projecting radially inwardly from wall portions of recess 50 are a pair of stop lugs 52 (FIG. 9) which cooperate to limit the angular movement of the stem 49 as will be described.

The cap 38 (FIG. 14) of the valve housing 36 comprises a substantially cup shaped member having an end wall 53 which is circumscribed by a cylindrical wall portion 54 to define an outlet chamber 55. Formed in the cylindrical wall portion 54 of the cap 38 is an opening 56 which is circumscribed by a tubular nipple 57 to define an outlet for the valve and the means by which the valve 30 is connected to the swirl chamber 33A of a back flow preventer 33. The outlet opening 56 in the wall of the cap portion 38 is made as large as possible without increasing the part size to prevent cavitation of the water flow. The end wall 53 of the cap portion 38 is depressed inwardly to define an internal boss 58, the inner end of which is provided with a recess 59 for accommodating a bearing disc 60 (FIG. 2A) as will be hereinafter described.

As shown in FIGURE 2 the respective housing components 37, 38 are interfitted by the insertion of the tubular extension 45 of the body 37 into the cap 38. An annular ridge or shoulder 61 formed about the exterior surface of the valve body 37 serves to limit the insertion of the valve body 37 into the cap portion 38 in the assembled position of the valve housing.

The valving means for controlling the flow of water comprises a pair of cooperating valve disc members that include the valve seat 47 and a rotatable valve member 62 held in intimate contact with one another and each of which is provided with one or more port openings 63, 64 respectively. Preferably the disc members 47 and 62 are formed with a plurality of port openings 63, 64 so as to provide a quick shut-off, allowing the water closet tank to fill with a relatively large volume of water until the ball float 34 is near the shut-off level. By way of example, valve members 47, 62 are shown having six equidistantly spaced port openings. The spacing of the port openings in the respective members is such that the rotatable member 62 is rotated relative to the seat member 47 to bring the respective port openings into and out of alignment.

Figure 5:
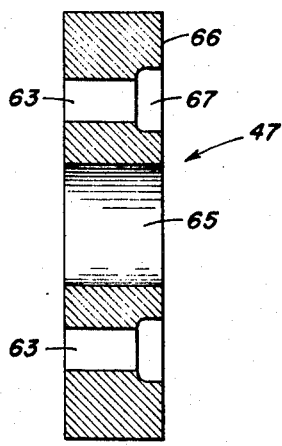
FIGURE 5 is a sectional view taken along the line 5—5 of FIGURE 4.
Figure 4:
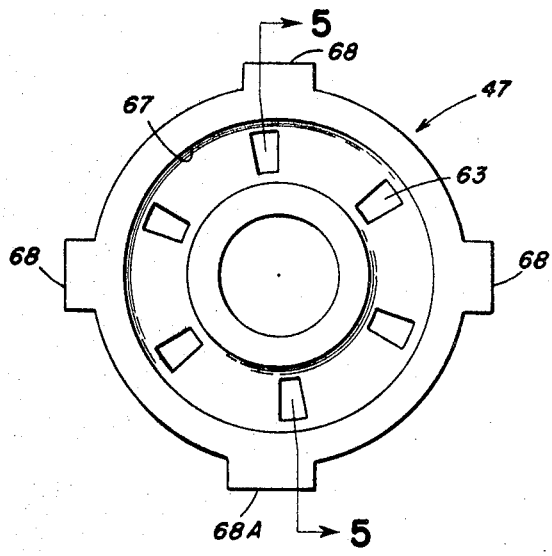
FIGURE 4 is an enlarged front view of the valve seat.
Figure 7:
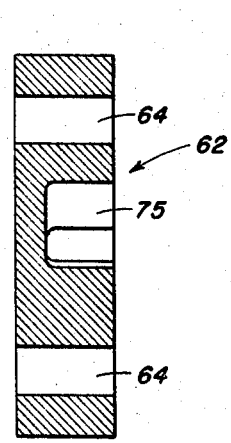
FIGURE 7 is a sectional view taken along the line 7—7 of FIGURE 6.
Figure 6:
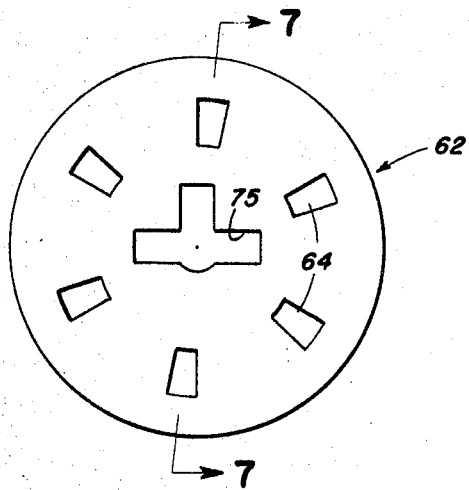
FIGURE 6 is an enlarged front view of the rotary valve member.

Referring to FIGURES 4 and 5, the valve seat 47 has a central stem opening 65 for the valve stem 49. The back face 66 of the seat 47 has formed therein an annular recess 67 which connects with each of the port openings 63. The arrangement is such that in the assembled position, the recess 67 complements the recess 43 (FIG. 8) to receive the seal 44.

To retain the seat 47 against rotation within the valve body 37, the seat 47 is provided with a plurality of radially extending fingers 68 which are adapted to be received in complementary notches or recesses 69 formed in the valve body 37. In the illustrated embodiment, one of the radial projections or fingers 68A and its complementary recess 69A is made larger than the other respective fingers 68 and complementary recesses 69 therefor. In this manner proper assembly is insured since the cooperative relation of the fingers 68 and notches 69 is such that it permits the valve seat member 47 to be assembled in one way only. It will be observed that the seat member 47 is retained or fixed against rotation with respect to the valve body 37 but is free for slight axial movement with respect thereto.

The rotatable valve member 62 is adapted to be held in intimate contact against the seat 47. As shown, the rotary valve member 62 is provided with a like number of port openings 64 and is maintained in contiguous abutting relationship on the outlet side of the seat by a bearing disc 60 which is free to rotate in the recess 59 defined in the end of the boss 58 in the cap 38.

As best seen in FIG. 2A, the thickness of the disc bearing 60 is made slightly greater than the depth of the recess 59 and its diameter is slightly less than that of the recess 59 accommodating the same. Thus the thrust end bearing is free to rotate within its recess. Preferably the disc bearing is formed of Teflon.

To resist the erosive and corrosive effects inherent in a water control for water closet tanks, it is preferred that the respective valve members 47 and 62 be formed of ceramic material and that the respective surfaces thereof which are disposed in intimate contact are formed with a highly-polished mirror-like finish to provide a minimum of friction therebetween. The arrangement of the valve members 47, 62 is such that valving is accomplished by the sealing which is effected when the multi-ported discs with mirror-like surfaces are held in intimate contact, and the flow of water therethrough occurs when the valve member 62 is rotated to bring the port openings 64 thereof into alignment with the port openings 63 of the seat member 47.

The actuating means for the valve member 62 comprises the shaft 49 having a stem portion 70 sized to conform to the shape of the stem bore 48 and a connected hub portion 51. The stem portion 70 is defined by a pair of journal portions 70A and 70B (FIG. 18), having diameters which complement the bearing portions 48B, 48A or the stem bore 48. Thus the bearing of the stem 70 is had at longitudinally spaced points and thereby avoids alignment binding which may otherwise result. The tolerance of the bore or bearing portions of the body can be better held with the relatively short lengths of straight diameters. As shown in FIGURE 18 the larger journaled part 70A of the stem is disposed adjacent to the hub 51 and thus increases the strength of the shaft 49 at the junction between the hub and the connected stem portions thereof.

The hub of the shaft 51 is provided with a laterally extending flange 71 having opposed notched out portions 72 which are adapted to engage or receive the stop lugs 52 (FIG. 9), as previously described, formed integral on the body portion 37 of the valve housing. The hub portion 51 is also provided with a triangularly shaped hole 73 for accommodating the arm or rod 35 to which the float 34 is connected. The end of the shaft 49 is provided with threads for receiving a nut 75 which secures the float arm 35 to the shaft 49.

The cooperative arrangement between the notched flange 71 of the shaft and the stop lugs 52 is to limit the angular rotation or movement of the valve shaft 49. In the illustrated embodiment, the sides of the notches 72 in the flange and the sides of the respective cooperating stop lugs 52 are dimensioned so as to provide a 14° downward movement of the float rod 35 from its off position and a 7° upward movement of the float rod 35 from its off position. The downward movement of 14° is made greater than the angle of the port openings in the seat so that a self cleaning action occurs on each operation. The 7° upward motion of the float past the off position is a safety margin for tolerance variations and for overlap if wear should occur at the edges of the port openings. While the surface of the stop lug 52 and the cooperating notches 72 of the flange 71 are proportioned to limit the movement thereof within the 14° and 7° above mentioned, it will be readily understood that the angular limits of stem movement may be varied by varying the angular dimensions of the complementary flange notches and cooperating stop lug to meet desired design conditions. The stop lugs 52 may be made sufficiently strong to permit bending of the float rod for adjusting purposes without damaging the valve.

In accordance with this invention, the shaft 49 is preferably formed of an acetal plastic because of its high strength characteristics and because it can be readily formed by injection molding. The nut for retaining the float arm is likewise preferably formed of similar material.

In the assembled position the portion 70 of the shaft is inserted through the bore 48 from the rear or outer side of the valve body so that the stem 49 is rotatably journaled therein. The flange 71 of the hub 51 is thus retained flushed against the outer wall of the valve body with the stop lugs 52 of the valve body disposed within the notches 72 of the flange 71. The inner end of the stem 49 is extended through the stem opening 65 of the valve seat 47 to engage the valve member 62. In accordance with this invention the inner end of the valve stem 70 is keyed into the valve member 62. As best seen in FIGURE 20 the inner end of the valve stem 70 is provided with a T-shaped cross section which is adapted to be received in the T-shaped slot 75 formed in the back surface of the rotary valve member 62. With the key arrangement described, incorrect assembly between the valve member 62 and the valve stem 70 is not possible.

Figure 22:
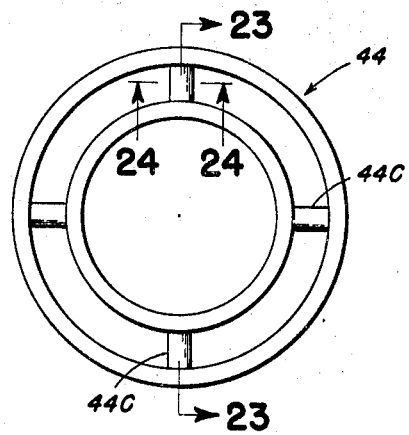
FIGURE 22 is an enlarged side view of the sealing means of the valve construction of FIGURE 1.
Figure 23:
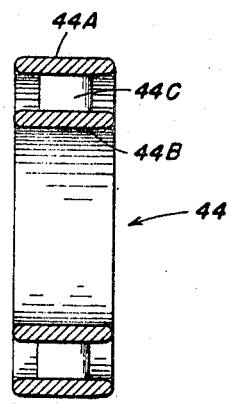
FIGURE 23 is a sectional view taken along line 23—23 of FIGURE 22.
Figure 24:
FIGURE 24 is a sectional view taken along line 24—24 of FIGURE 22.

In accordance with this invention the sealing means 44 is interposed between the valve seat 47 and the valve body 37 forming a fluid tight seal therebetween and providing a seal to isolate the shaft 49 from the fluid passageways of the valve. As shown in FIGS. 22 to 24 the sealing means 44 includes a pair of concentrically spaced washers 44A, 44B integrally connected by a plurality of circumferentially spaced web portions 44C. The sealing means 44 is disposed and retained in assembled position within the complementary recesses 43 and 67 in the valve body 37 and in the back side of the valve seat member 47 respectively. When assembled, the arrangement is such that the sealing means 44 is compressed to insure its own sealing between the valve seat 47 and the valve body 37 and to exert a force tending to hold the mating surfaces of the valve members 47 and 62 in intimate contact at low inlet pressures. In this regard it will be observed that valve members 47 and 62 are not fixed to the housing. Thus with the inlet water pressure acting against the seat member 47 in the annular area between the inner and outer sealing rings 44A, 44B, the resulting force thereon will tend to force the seat member 47 against the rotatable member 62 thereby maintaining the valve members 47, 62 in intimate contact. The rotatable member 62 is, of course, in turn held against the thrust bearing 60. In order to insure that the valve members 47, 62 are held against one another with sufficient force at low inlet pressures, the sealing means 44 is installed so that it is compressed about 10 percent whereby the resiliency resulting from the compression will urge the valve members 47, 62 against one another. It will also be observed that the sealing means 44 limits the area on the seat member 47 exposed to inlet water pressure so that at higher inlet pressures the forces urging the valve members 47, 62 against one another will not be excessive as to make it difficult to rotate the rotatable valve member 62.

The seal 44 is essentially two seals made as one, with the webs 44C integrally connecting the inner and outer sealing rings 44A, 44B. The longitudinally elongated cross-sectional shape of the respective sealing rings maintains an almost constant percentage of compression with varying tolerance stack-ups. It will also be observed that because of the sealing means 44 and because of the sealing contact of the valve discs 47 and 62 adjacent the stem opening 65 and slot 75, that the stem 49 is completely isolated from the fluid in the valve and accordingly, separate packing therefor is not required.

It will thus be apparent that the sealing washers 44A, 44B define a flow passageway therebetween that communicates the annular inlet chamber 41 of the valve body 37 with the port openings 63 in the valve seat 47. They also render the housing of the valve fluid tight and isolate the stem bore 48 from the fluid chambers of the valve housing.

Since the sealing means 44 exerts a pressure between the valve body 37 and the valve discs tending to separate the valve body 37 from the valve cap 38, fastening means such as rivets or bolts 77 may be provided to maintain the respective sections 37, 38 of the housing in the assembled relationship. As shown in FIGURES 9 and 16 the respective sections of the housing are each provided with openings extending transversely therethrough at the corner portion thereof for receiving suitable rivets or studs 77 by which the respective sections of the housing may be secured together. If desired the assembled housing can be permanently sealed by solvent welding of the body portion 37 to the cap portion 38 or both solvent welding and bolts may be used.

The shaft 49 is retained in place by means of a retaining washer 78 which is itself retained by the nuts of the bolts or studs 77 utilized to maintain the respective sections of the valve housing in assembled position. The retaining washer 78 may be formed of a rigid plastic material.

FIGURE 21 illustrates a cross-sectional view of a modified stem construction. In this form of the invention the journal portions of the stem 49 may be provided with opposed flat portions.

From the foregoing, it would be readily apparent that the development of the valve construction, as described, provides for a relatively low cost water control which utilizes seats that provide for positive on-off action of the valve. The housing, which may be formed of an all plastic construction, further affords a long, useful life which offers a maximum of resistance to both the erosive and corrosive conditions inherent in water closet tank operation. The instant construction further eliminates the need for a stem packing, and is constructionally arranged to offer good resistance to valve fouling with self-cleaning.

Figure 25:
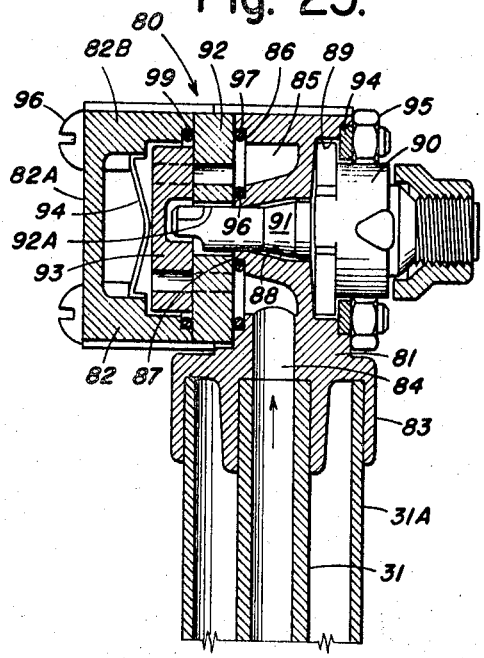
FIGURE 25 is a cross-sectional view of a modified valve construction.

FIGURE 25 illustrates a modified form of the invention. In this form of the invention, the valve 80 comprises a valve housing which is also formed of a pair of complementary plastic housing portions including a body portion 81 and a cap portion 82. The body 81 of the valve housing has integrally formed therewith a fitting 83 by which it is secured to the upper ends of the riser tube 31 and associate sheet tube 31A. The body 81 is provided with an inlet passageway 84 which communicates the upper end of the riser tube 31 to an annular passageway or inlet chamber 85 formed within the body portion. The outlet of the chamber 85 is defined as an enlarged annular recess 86 formed in the surface 87 of the valve body 81. The valve body is also provided with a bore or stem passageway 88 coaxially disposed with respect to the annular inlet chamber 85. The outer end portion of the body 81 is provided with a recess 89 for accommodating the hub portion 90 of the valve stem 91.

The cap 82 of the valve housing is a cup shape member having a substantially flat end wall 82A circumscribed by a substantially cylindrical wall portion 82B and it is provided with a lateral extension or nipple (not shown) to define the outlet by which the valve housing 80 is connected to the swirl chamber of a back flow preventer, as hereinbefore described.

The valving means comprises a pair of cooperating valve members including a fixed valve seat 92 and a rotatable valve disc 93.

The valve seat 92 is disposed or sandwiched between the body 81 and cap 82 of the housing 80 and is maintained therebetween in a fixed relationship. The arrangement is such that the seat 92 defines a ported wall portion of the inner inlet chamber 85 of the valve body.

The rotating valve member 93 is maintained in contact on the outlet side of the seat 92 by means of a spider spring 94 disposed between the rotary member 93 and the end 82A inner face of the cap 82. Each of the valve members 92, 93 is ported as shown.

The valve actuator comprises a valve shaft 90 substantially similar to that hereinbefore described, and it is rotatably journaled in the stem passageway 88 so that the inner end is extended through the stem opening 92A of the seat member 92 with the extreme end thereof keyed to the rotary member 93 as previously described. The arrangement is such that the rotary member 93 is rotated relative to the stationary seat 92 upon rotation of the valve stem 91.

The valve shaft 91 is retained within the recessed portion 89 of the valve body 81 by means of a retainer ring 94 which in turn is held in place by the nuts 95 threaded to screws 96 that secure the housing components 81, 82 in the assembled position.

In this form of the invention sealing of the valve housing and of the stem passageway 88 from the fluid chambers of the valve is attained by a pair of O-rings 96, 97 disposed between the inner surface 86 of the valve body and the valve seat 92. Sealing between the cap 82 of the valve housing and the valve seat 92 is attained by another O-ring 99.

The shaft 90 in this form of the invention is substantially similar to that hereinbefore described, and consequently its operation and function is similar to that of the valve described with reference to the embodiment of FIGURES 1 through 24.

Figure 26:
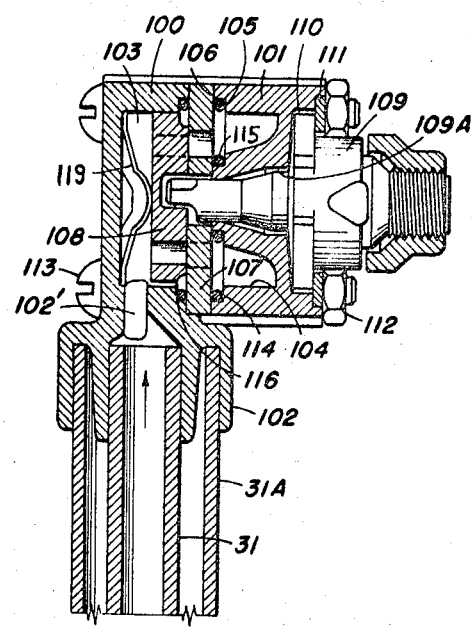
FIGURE 26 is a cross-sectional view of still a further modified valve construction.

FIGURE 26 illustrates a further modified form of the invention. As shown therein the valve housing comprises a body 101 and a cap 100. The cap 100 has integrally formed therein a fitting 102 similar to that herein described by which it is secured to the upper end of a riser tube 31 and its associated sheath tube 31A. The cap 100 is also provided with an inlet 102' which communicates with the inlet chamber 103.

The body 101 is provided with an annular recess to define the outlet chamber 104 of the valve body and it communicates with a lateral opening (not shown) by which the valve is connected to the back flow preventer as hereinbefore described. The outlet chamber 104 opens to an enlarged recess 105 formed in the seat surface 106 of the body portion.

The valve members of this modified embodiment comprise a ported seat member 107 which is sandwiched between the body 101, valve 108 and cap 100 of the valve housing. The rotary valve member 108 is disposed in intimate sealing contact with the stationary valve seat 107. As shown the rotary valve member 108 is disposed on the inlet side of the stationary seat member 107 and is maintained in sealing relationship therewith by means of the inlet pressure acting thereon. A spider spring 119 supplements the force of the inlet pressure for holding the rotary member 108 into intimate contact relationship with respect to the stationary seat member 107.

The actuating means comprises a shaft structure 109 which is journaled in a bore 109A formed substantially similar to that hereinbefore described, and for this reason, a further description thereof is not considered pertinent to the understanding of this embodiment. The shaft 109 is maintained within the recess 110 formed on the back side of the body 101 by means of a retainer ring 111 which itself is retained in position by means of the nuts 112 threaded to the shank of the screws 113 which maintain the valve body and cap portion in assembled position.

Suitable O-rings 114, 115, and 116 are employed to maintain the valve fluid tight in the assembled position thereof.

What is claimed is:

1. In a valve comprising a housing having an inlet and an outlet, a seat member within said housing between said inlet and outlet, said seat member having a port opening and a stem opening, a rotary member in said housing abutting said seat member, said rotary member having a port opening, a stem having one of its ends connected to a float by means of a float arm and its other end extending through said stem opening in said seat member to engage said rotary member for rotating the later relative to the seat member to communicate said port openings when said float moves a specified distance, means in said housing defining a channelway generally coaxial with said stem opening, resilient means arranged in said housing to urge said seat member against said rotary member and to provide a water tight seal between said housing and said seat member to isolate said channelway from the fluid passage in the valve, said stem extending through said channelway whereby said stem is isolated from fluid flowing through the valve.

2. The invention as defined in claim 1 wherein said seat member is rotationally fixed and axially movable within said housing.

3. The invention as defined in claim 1 wherein said seal means abuts said seat member on the inlet side of the latter to limit the area of the seat member exposed to the inlet pressure of the fluid.

4. The invention as defined in claim 1 wherein said seal comprises annular and concentrically spaced resilient members joined by circumferentially spaced interconnecting webs.

5. A valve comprising a housing having an inlet and outlet, valving means disposed within said housing between said inlet and outlet, said valving means comprising a rotationally fixed valve seat member and a rotatable valving member rotatably movable relative to said seat member, said members being disposed in intimate contacting relationship with respect to one another, each of said members having a port opening therein whereby the rotation of said rotatable valving member causes the port opening therein to be moved into and out of alignment with the port opening of said valve seat member, actuating means comprising a float, a float arm having one of its ends attached to said float and its other end attached to means which in turn is connected to said rotatable valving member to effect the rotation of said valving member to said seat member, and a resilient means arranged in said housing to urge said seat member against said rotatable member and defining a fluid tight seal between said housing and said valve seat member for isolating said actuating means from the fluid flowing through said valve.

6. The invention as defined in claim 5 wherein said valve seat member and said valving member are formed of a ceramic material, each having a highly polished, mirror like surface.

7. The invention as defined in claim 5 wherein said valve seat member and housing includes co-operating keying means for insuring proper assembly of said seat member within said housing.

8. A valve comprising a housing said housing having means defining a fluid inlet chamber and a bore, a valve seat member disposed within said housing, said valve seat member having a stem opening disposed in alignment with said bore and a port opening in communication with said inlet chamber, a rotary valve member disposed in contiguous relationship with said valve seat member on the outlet side thereof, said rotary valve member having a port opening adapted to be rotated into and out of alignment with the port opening of said valve seat member, a valve stem having one of its ends connected to a float by means of a float arm and its other end extending through said bore and said stem opening of said valve seat member, whereby said rotatable valving member is caused to rotate with respect to said seat member, and resilient means arranged in said housing to urge said seat member against said rotary member and during movement of said float defining a fluid tight seal between said housing and said valve seat member to isolate said inlet chamber from said bore.

9. A valve comprising a housing having a body portion and a complementary cap portion, said body portion defining a fluid inlet and a connected fluid inlet chamber, said cap portion including a fluid outlet chamber and a connected fluid outlet therefor, valving means disposed within said housing between said inlet chamber and outlet chambers by which said chambers are placed into and out of communication for controlling a flow of fluid through said valve, said valving means comprising a seat member and a rotatable valving member, each of said members having a port opening therein whereby the port opening of said rotatable valving member is disposed into and out of alignment with respect to the port opening of said seat member to control fluid flow therethrough, said seat member having a stem opening therein, said housing having a bore in coaxial alignment with the stem opening of said seat member, a stem having one of its ends connected to a float by means of a float arm and its other end extending through said bore and stem opening of said seat member to engage said rotatable valving member, whereby said rotatable valving member is caused to rotate with respect to said seat member during movement of said float and resilient means arranged in said housing to urge said seat member against said rotary member and defining a fluid tight seal between said seat member and said housing to isolate said stem from the fluid in the valve.

10. The invention as defined in claim 9 wherein said housing has means for limiting the angular rotation of said stem within said bore.

11. The invention as defined in claim 10 wherein said limiting means comprises complementary means formed on said stem and valve housing, said complementary means including a radial flange on said stem, said flange having circumferentially spaced notched out portions, and said housing having complementary projections adapted to register with the notched out portions of said flange, said projections defining a limit stop for the angular rotation of said stem.

12. A water control for use in a water closet comprising a housing defined by a pair of complementary housing sections, one of said housing sections having means defining a fluid inlet chamber and means defining a bore extending therethrough and opening to the interior of said housing, the second of said housing sections having means defining a fluid outlet chamber, a valving means interposed between the respective inlet and outlet chambers said first section of said housing to urge said seat member and a complementary rotatable valving member, each of said members having port openings formed therein, said rotatable valving member being rotatable relative to said seat member whereby said port openings of the respective members may be brought into and out of alignment to control the flow of fluid through said housing, a valve stem rotatably journaled in said bore, said stem having one of its ends connected to a float by means of a float arm and its other end connected to said rotary valving member to effect the actuation thereof when said float is caused to move and resilient means arranged in said first section of said housing to urge said seat member against said rotatable member and forming a fluid tight seal between said seat member and its adjacent housing section to isolate the stem bore and stem journaled therein from the fluid chambers of said housing.

13. The invention as defined in claim 12 wherein said fluid tight seal comprises means defining a fluid passageway between the port openings of said seat member and the inlet chamber of the adjacent housing section, said seal being compressed therebetween to exert a force biasing the valve seat member toward said rotary valving member.

14. The invention as defined in claim 12 wherein said seal means comprises a pair of annular and concentrically spaced resilient members, said resilient members defining therebetween fluid passageway means communicating the port openings of said seat member and the inlet chamber of the adjacent housing section, and circumferentially disposed webs maintaining said resilient members in spaced relationship.

15. A valve comprising a valve housing including a body portion and a complementary cap portion, said body portion having means defining a fluid inlet chamber, said body portion having a bore extending therethrough coaxially disposed with said inlet chamber, said cap portion comprising means defining a fluid outlet chamber, a valve seat member and complementary rotary valving member disposed between the respective inlet and outlet chambers, said seat member having a stem opening disposed in alignment with said bore and a port opening communicating with said inlet chamber, said rotary valving member abutting said valve seat member on the outlet side thereof, and having a port opening, a stem having one of its ends connected to a float by means of a float arm and its other end extending through said stem opening in said seat member to engage said rotary member whereby said port opening in said rotary valving member will rotate into and out of alignment with the port opening of the seat member to control the flow of fluid through said valve when said float moves a specified distance, resilient means arranged in said body portion of said housing to urge said seat member against said rotary member and defining a fluid tight seal disposed between said body portion and said seat member to isolate said bore from the fluid passageways of the valve, and a stem extending through said bore with the inner end of said stem extending through the stem opening of said valve seat member to engage said rotary valving member.

16. The invention as defined in claim 15 wherein said cap portion supports means defining an end thrust bearing for said rotary valving member.

17. The invention as defined in claim 16 wherein said end thrust bearing comprises a disc rotatably housed within said cap portion of said housing.

18. The invention as defined in claim 15 wherein said seat member and body portion are provided with complementary means for insuring proper assembly of said seat member with respect to said body portion.

19. The invention as defined in claim 18 wherein said seat member and valving member are formed of a ceramic material, each having their respective contiguous surfaces highly polished.

20. The invention as defined in claim 15 wherein said seal means comprises a pair of annular concentrically spaced resilient members having circumferentially spaced webs, said resilient members being compressed between said seat member and said body member for urging said valve seat into contact with said rotary valve member.

21. The invention as defined in claim 15 further comprising means for limiting the angular rotation of said stem.

No references cited.

WILLIAM F. O'DEA, Primary Examiner

D. R. MATTHEWS, Assistant Examiner

U.S. Cl. X.R.

137—329.01, 447, 625.31, 625.46; 251—159, 174, 287, 363, 368